United States Patent [19]

Ogano et al.

[11] Patent Number: 5,064,011
[45] Date of Patent: Nov. 12, 1991

[54] CRAWLER-PROPELLED TRUCK

[75] Inventors: Takeo Ogano; Hiroshi Sueshige, both of Saitama; Toru Fukuda, Tokyo; Junji Okuda, Saitama, all of Japan

[73] Assignee: Honda Giken Kogyo Kabushiki Kaisha, Tokyo, Japan

[21] Appl. No.: 161,318

[22] Filed: Feb. 23, 1988

Related U.S. Application Data

[63] Continuation of Ser. No. 829,805, Feb. 14, 1986, abandoned.

[30] Foreign Application Priority Data

Feb. 14, 1985 [JP] Japan .................................. 60-27305
Feb. 14, 1985 [JP] Japan .................................. 60-27306

[51] Int. Cl.$^5$ ........................... B60K 5/06; B62B 5/02; B62D 11/08
[52] U.S. Cl. .................................. 180/9.22; 180/9.54; 180/9.56; 180/9.62; 180/19.1; 180/337
[58] Field of Search ........................ 180/9.1, 9.22, 9.54, 180/9.56, 19.1, 19.2, 19.3, 70.1; 280/47.34; 298/1 C, 2

[56] References Cited

U.S. PATENT DOCUMENTS

| | | | |
|---|---|---|---|
| 2,046,560 | 7/1936 | Johnson et al. | 180/19.1 X |
| 2,349,100 | 5/1944 | Liggett | 180/9.62 |
| 2,827,972 | 3/1958 | West | 180/19.1 X |
| 2,973,822 | 3/1961 | Merry | 180/9.22 X |
| 3,219,133 | 11/1965 | Clowers | 180/19.1 X |
| 3,221,830 | 12/1965 | Walsh | 180/9.62 X |
| 3,295,622 | 1/1967 | Pitchford | 180/9.22 |
| 3,595,332 | 7/1971 | Sanstrom | 180/70.1 X |
| 3,696,878 | 10/1972 | Nelson | 180/9.64 X |
| 4,170,273 | 10/1979 | Kodama et al. | 180/70.1 X |
| 4,354,564 | 10/1982 | Watanabe et al. | 180/19.1 |
| 4,432,426 | 2/1984 | Misawa | 180/9.22 X |

FOREIGN PATENT DOCUMENTS

| | | | |
|---|---|---|---|
| 187427 | 10/1956 | Fed. Rep. of Germany . | |
| 198138 | 6/1958 | Fed. Rep. of Germany . | |
| 3004647 | 8/1981 | Fed. Rep. of Germany | 180/374 |
| 2545678 | 11/1984 | France . | |
| 652642 | 2/1948 | United Kingdom | 180/19.1 |

Primary Examiner—Mitchell J. Hill
Attorney, Agent, or Firm—Irving M. Weiner; Joseph P. Carrier; Pamela S. Burt

[57] ABSTRACT

A crawler-propelled truck includes a chassis frame assembly, an engine mounted on the chassis frame assembly and having a substantially vertical crankshaft, a gear transmission case having an upper portion coupled to the engine and housing a gear transmission operatively coupled to the engine, drive wheels supported on a lower portion of the gear transmission case and rotatable by the engine through the gear transmission, driven wheels rotatably supported on the chassis frame assembly forwardly of the drive wheels, crawlers trained around the drive and driven wheels, and a load carrying table mounted on the chassis frame assembly above the crawlers.

6 Claims, 6 Drawing Sheets

CRAWLER-PROPELLED TRUCK

This is a continuation of application Ser. No. 829,805, filed Feb. 14, 1986 now abandoned.

BACKGROUND OF THE INVENTION

The present invention relates to a crawler-propelled truck movable on power-driven crawlers or endless chains of plates, and more particularly to a crawler-propelled truck equipped with a small-size power unit having its center of gravity located in a low position.

Some conventional crawler-propelled trucks have an engine for driving the crawlers, the engine being a horizontal engine with its crankshaft lying horizontally. In order to transmit engine power to the drive wheels engaging the crawlers, the crawler-propelled trucks include a power transmission mechanism such as a gear train or a belt-and-pulley mechanism between the crankshaft and the gear transmission or between the gear transmission and the drive wheels. Disadvantageously, such a drive unit including the engine, the gear transmission, and the power transmission mechanism is large in size, whereby a load-carrying space on the truck is correspondingly reduced. The large-size drive unit is also disadvantageous in that its center of gravity is necessarily relatively high.

Both front and rear wheel drive systems have been proposed for driving the crawlers of the crawler-propelled trucks. Those crawler-propelled trucks which are equipped with a crawler tensioning mechanism employ a front wheel drive system with the crawler tensioning mechanism associated with the rear wheels.

When the crawler-propelled truck with the front wheel drive system moves over an irregular road surface, however, shocks imposed by road surface irregularities on the front wheels are transmitted directly to the truck chassis. This has led to a problem in that the crawler-propelled truck cannot follow such an irregular road surface very closely or in a quick response.

SUMMARY OF THE INVENTION

In view of the aforesaid drawbacks of the conventional crawler-propelled truck, it is an object of the present invention to provide a crawler-propelled truck which has a small-size drive unit, including an engine and a gear transmission case, to correspondingly increase the truck's load-carrying space, and whereby the drive unit has a low center of gravity.

Another object of the present invention is to provide a crawler-propelled truck which can follow a road surface very closely and has an improved traveling response capability.

According to the present invention, there is provided a crawler-propelled truck comprising a chassis frame assembly, an engine mounted on the chassis frame assembly and having a substantially vertical crankshaft, a gear transmission case having an upper portion coupled to the engine and housing a gear transmission operatively coupled to the engine, drive wheels supported on a lower portion of the gear transmission case and rotatable by the engine through the gear transmission, driven wheels rotatably supported on the chassis frame assembly forwardly of the drive wheels, crawlers trained around the drive and driven wheels, and a load carrying table mounted on the chassis frame assembly above the crawlers.

The above and further objects, details and advantages of the present invention will become apparent from the following detailed description of a preferred embodiment thereof, when taken in conjunction with the accompanying drawings.

DETAILED DESCRIPTION OF THE PREFERRED EMBODIMENT

Figure 1:
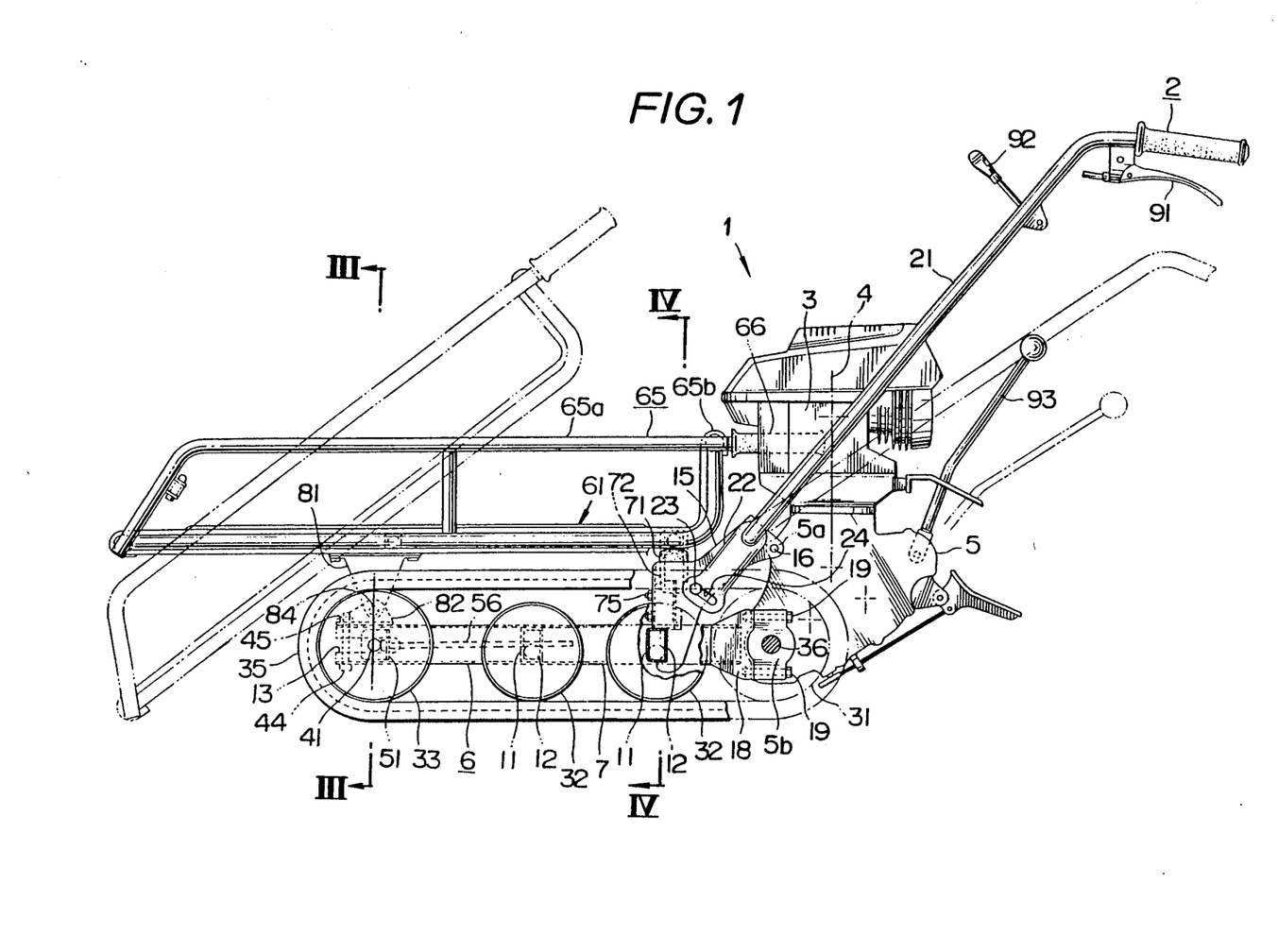
FIG. 1 is a side elevational view, partly broken away, of a crawler-propelled truck according to the present invention.

A crawler-propelled truck according to the present invention, generally designated by the reference numeral 1 in FIG. 1, comprises a pair of laterally spaced steering handles 2 (only one shown), a vertical engine 3 having a crankshaft with its axis extending vertically, a gear transmission case 5, and a chassis frame assembly 6 including a pair of laterally spaced longitudinal frames 7, 7 (FIGS. 2, 3, and 4) each extending parallel to the longitudinal axis of the truck and having a channel-shaped cross section.

The frame assembly 6 also includes a pair of front and rear cross members 11, 11 (FIG. 2) extending transversely between the longitudinal frames 7, 7 at intermediate and rear portions thereof. Two shafts 12, 12 are transversely fixed to the longitudinal frames 7, 7, the shafts 12, 12 extending through the cross members 11, 11, respectively. Each of the longitudinal frames 7, 7 has a slot 13 defined longitudinally in the front end thereof and opening forwardly.

Figure 2:
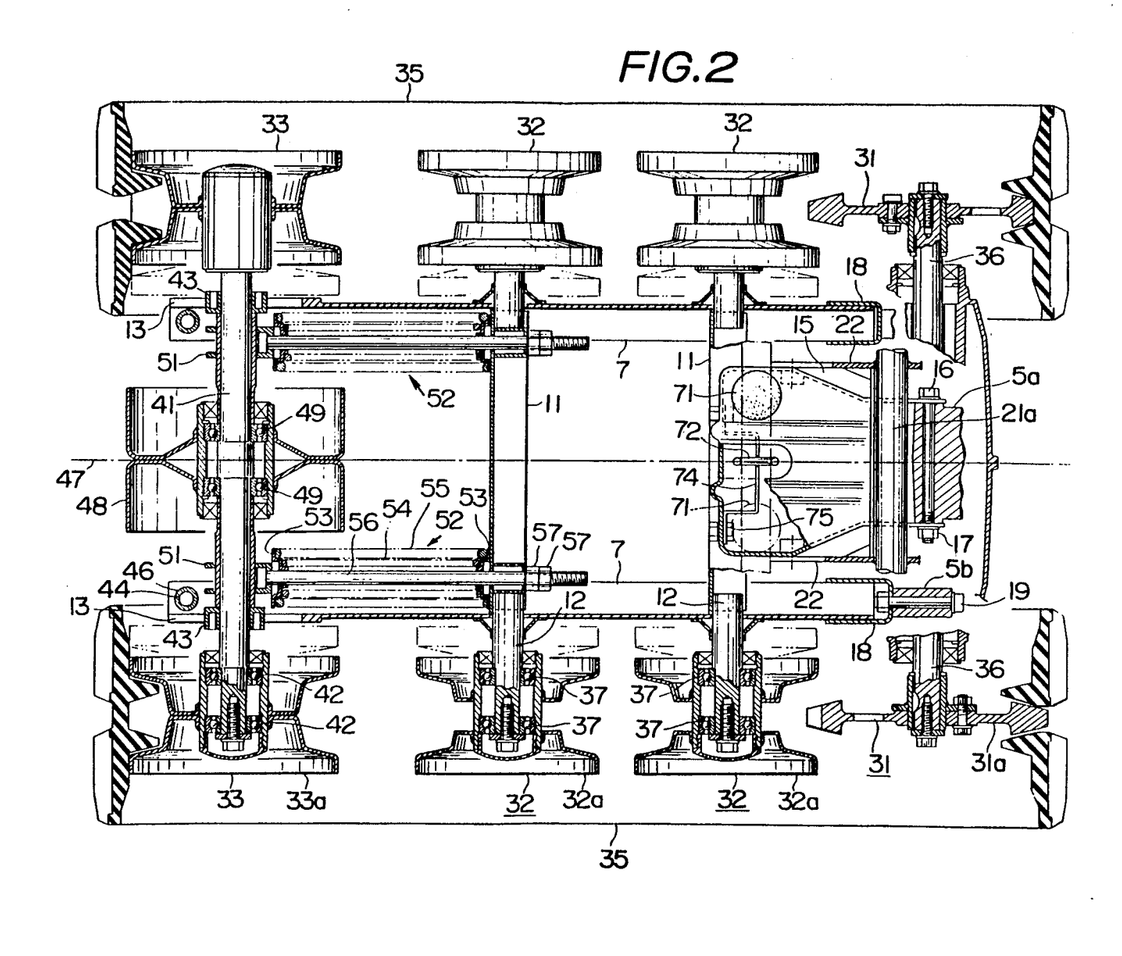
FIG. 2 is a horizontal cross-sectional view of a frame of the crawler-propelled truck shown in FIG. 1.

A bracket 15 is attached to the rear cross member 11 and extends obliquely upwardly in the rearward direction. The handles 2 are connected to handle pipes 21, respectively, having their lower ends joined by a horizontal pipe 21a rotatably supported on the bracket 15. Two brackets 22 mounted on and extending downwardly from the lower end 21a of the handle pipes 21 are coupled to the laterally opposite sides of the bracket 15 by bolts 23 extending through slots 24 defined in the respective brackets 22. Therefore, the handles 2 are angularly adjustable with respect to the frame assembly 6 through the bolts 23 and the slots 24.

Figure 5:
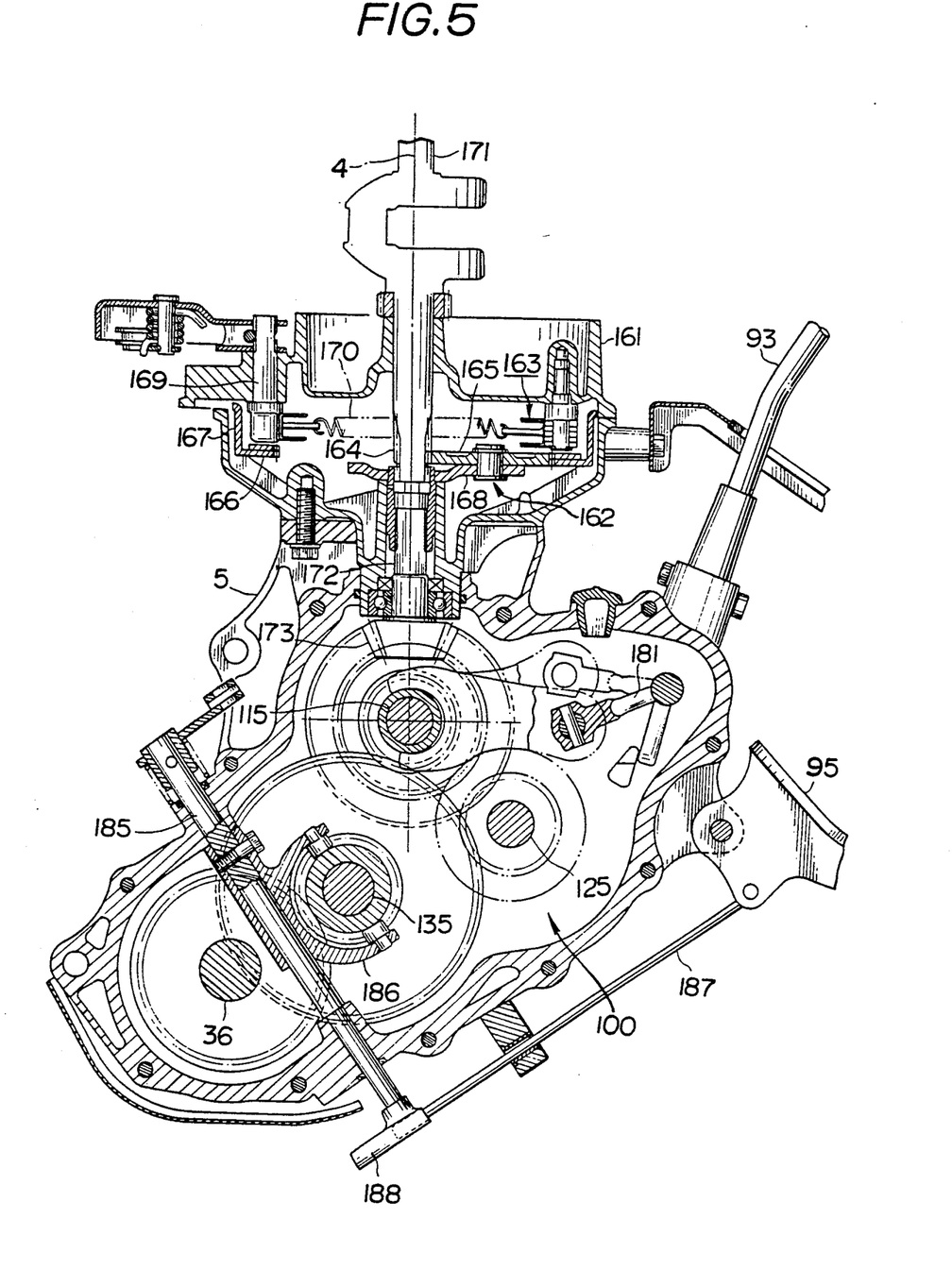
FIG. 5 is a vertical cross-sectional view of a gear transmission of the crawler-propelled truck.
Figure 6:
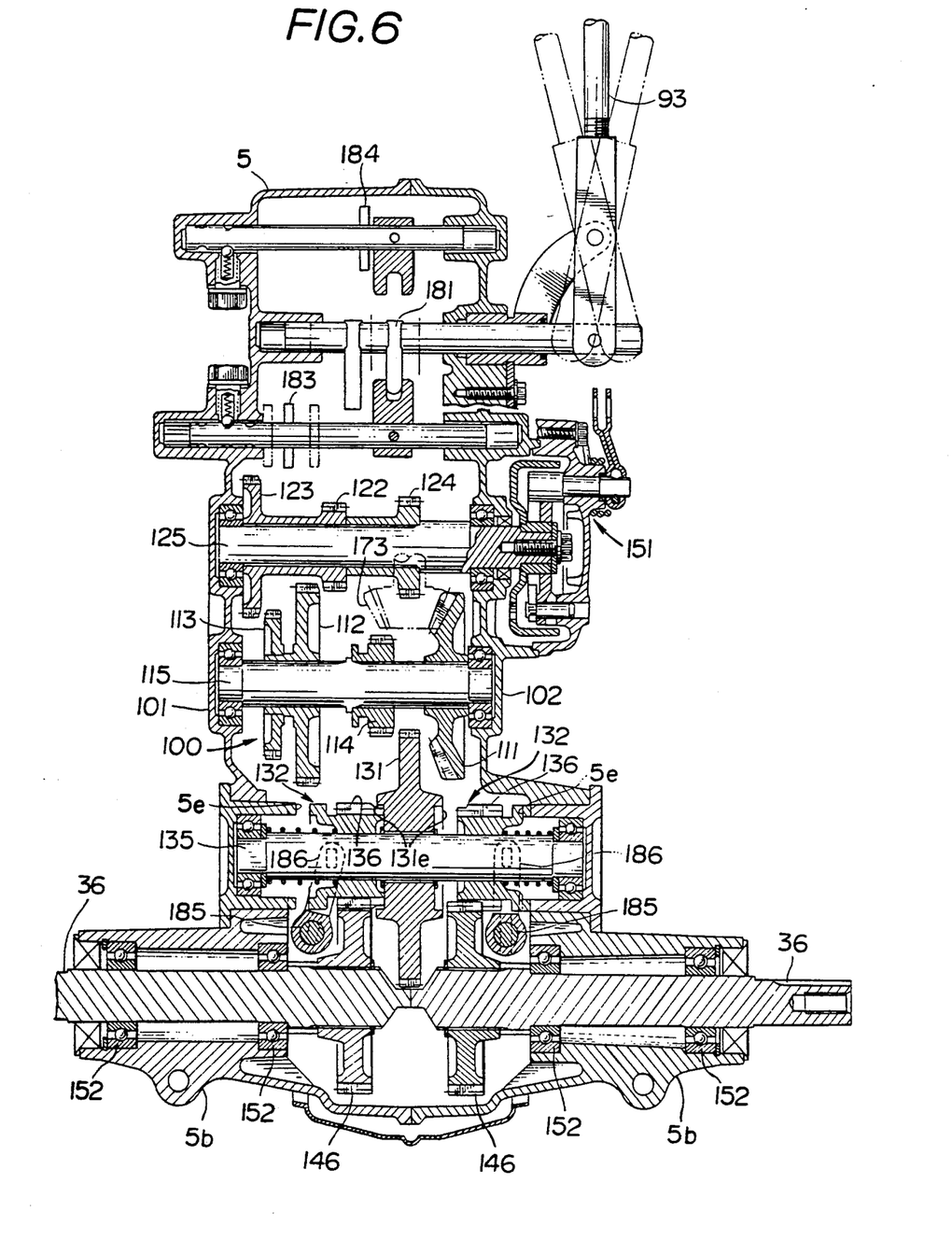
FIG. 6 is a developed cross-sectional plan view of the gear transmission illustrated in FIG. 5.

As illustrated in FIGS. 5 and 6, the gear transmission case 5 comprises a pair of casings 101, 102 housing a gear transmission 100 therein and has its upper portion coupled to the lower portion of the engine 3. The gear transmission 100 includes a first speed-change shaft 115 supporting a bevel gear 111, forward gears 112, 113, and a reverse gear 114, a second speed-change shaft 125 supporting forward gears 122, 123 for mesh with the gears 112, 113, and a gear 124, a third speed-change shaft 135 supporting a gear 131 for mesh with the gears 114, 124 and a pair of dog clutch mechanisms 132 one disposed one on each side of the gear 131, for selective engagement with or disengagement from engaging surfaces 131e on the opposite sides of the gear 131 and engaging surfaces 5e on the opposite inner sides of the casings 101, 102, and a pair of coaxial output shafts 36, 36 supporting gears 146, 146 meshing with respective gears 136, 136 of the dog clutch mechanism 132, 132. A brake mechanism 151 is mounted on one end of the second speed-change shaft 125. The output shafts 36, 36 are rotatably supported by bearings 152 mounted in bearing sleeves 5b, 5b, and have inner ends held in axial abutment against each other.

The engine 3 has a lower case 161 coupled to the gear transmission case 5 and houses a clutch mechanism 163, which comprises a planetary gear mechanism 162. The planetary gear mechanism 162 comprises a gear 164 on a lower end portion of a vertical crankshaft 171 of the engine 3, a planet gear 165 meshing with the gear 164, a ring gear 166 rotatably supported on the lower case 161 and meshing with the planet gear 165, a drum 167 rotatable with the ring gear 166, a cam member 169 for freely preventing rotation of an arm 168 joined to the planet gear 165 and rotation of the drum 167, and a spring 170 for normally urging the cam member 169 in a direction to allow the drum 167 to rotate. The clutch mechanism 163 also has an output shaft 172 coupled to the arm 168 and positioned coaxially with the crankshaft 171. A bevel gear 173 mounted coaxially on the output shaft 172 is held in mesh with the bevel gear 111. Thus, engine power can be transmitted from the crankshaft 171 through the clutch mechanism 163 and the gear transmission 100 to the output shafts 36, 36.

The forward gears 112, 113 and the reverse gear 114 can be selected by a shift lever 93 through a shift pin 181 and shift arms 183, 184. The dog clutch mechanisms 132, 132 can individually be actuated by side clutch levers 91 (only one shown in FIG. 1) through shafts 185, 185 and shift arms 186, 186. The brake mechanism 151 is actuated after the clutch mechanism 163 is disconnected by a clutch brake lever 92. The dog clutch mechanisms 132 can be disconnected by a pedal 95 (FIG. 5) through a rod 187, a cam member 188, and the shift arms 186, 186.

The drive unit which comprises the engine 3 and the gear transmission case 5 can be mounted on the frame assembly 6 in the following manner: The bearing sleeves 5b, 5b are coupled by bolts 19 to respective brackets 18, 18 attached to the rear ends of the longitudinal frames 7, 7. A gear transmission case potion 5a (FIG. 2) that is spaced upwardly from the bearing sleeves 5b, 5b is coupled to the bracket 15 by a bolt 16 and a nut 17.

As shown in FIG. 2, drive wheels 31 are mounted on the outer ends, respectively, of the output shafts 36, 36. Driven wheels 32 are mounted on the outer ends of the fixed shafts 12, 12. Driven wheels 33 are mounted on the outer ends of a shaft 41 (described later). These drive and driven wheels 31, 32, 33 have wheel bodies 31a, 32a, 33a around which two crawlers or endless chains of plates 35, 35 are trained.

More specifically, the wheel bodies 31a of the driver wheels 31 are fixed to the outer ends of the output shafts 36 which project laterally out of the gear transmission case 5. The wheel bodies 32a of the intermediate driven wheels 32 are rotatably supported on the outer ends of the fixed shafts 12 by bearings 37. The wheel bodies 33a of the front driven wheels 33 are rotatably supported on the outer ends of the shaft 41 by bearings 42. The shaft 41 extends through the slots 13 transversely of the longitudinal frames 7, 7. The shaft 41 is slidably disposed in the slots 13 by sliders 43. Collars 46 are disposed in the front ends of the slots 13 and fixed in position by bolts 44 and nuts 45 thereby to close the open ends of the slots 13.

An auxiliary wheel 48 is rotatably mounted on the shaft 41 by bearings 49, 49 in alignment with the longitudinal central axis 47 of the truck 1. Two brackets 51, 51 are mounted on the shaft 41 one on each side of the auxiliary wheel 48 and inwardly of the longitudinal frames 7, 7.

Figure 3:
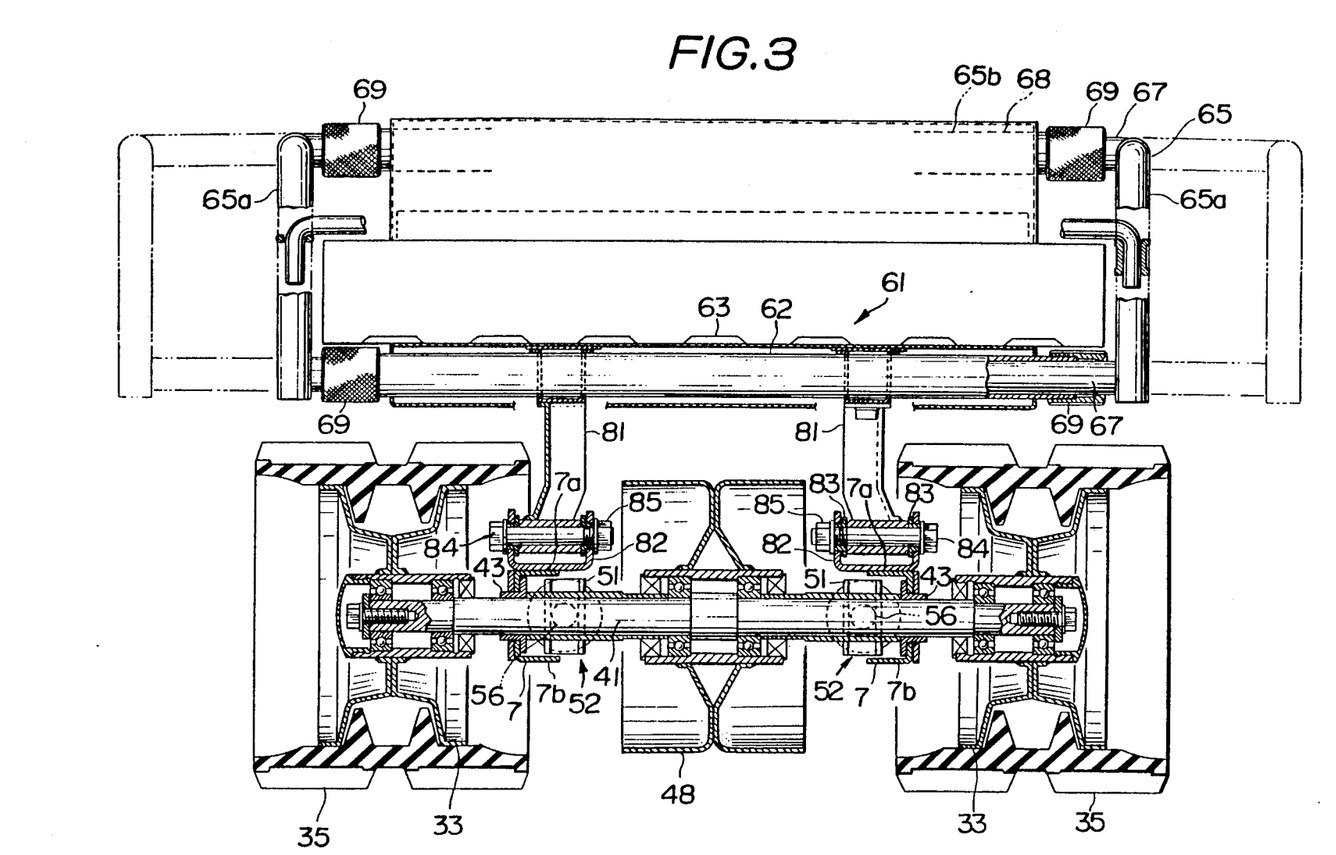
FIG. 3 is a cross-sectional view taken along line III—III of FIG. 1.

Crawler tensioning mechanisms 52, 52 are mounted between the front cross member 11 and the brackets 51, 51. Each of the crawler tensioning mechanisms 52, 52 comprises inner and outer coil springs 54, 55 having front and rear ends supported by spring seats 53, 53 on the bracket 51 and The cross member 11, the inner spring 54 is disposed coaxially in the outer spring 55, and a bolt 56 having a head engaging the bracket 51 and extends through the spring seats 53, 53 and the cross member 11. The coil springs 54, 55 and the bolt 56 extend along the longitudinal frames 7 and are located within the vertical dimension of the longitudinal frames 7 when seen in side elevation as shown in FIG. 1. In the illustrated embodiment, the coil springs 54, 55 and the bolt 56 have their half portions located between upper and lower members 7a, 7b of the longitudinal frame 7, as shown in FIG. 3. The shaft 41 is normally urged forwardly by the coil springs 54, 55 so as to tension the crawlers 35, 35. The position of the shaft 41 with respect to the front ends of the longitudinal frames 7 in the longitudinal direction thereof can be adjusted by adjustment nuts 57, 57 threaded over each of the bolts 56. When the truck moves over an irregular road surface, the crawlers 35, as they contact road surface irregularities, cause the driven wheels 33 to move the shaft 41 back and forth in the slots 13.

Figure 4:
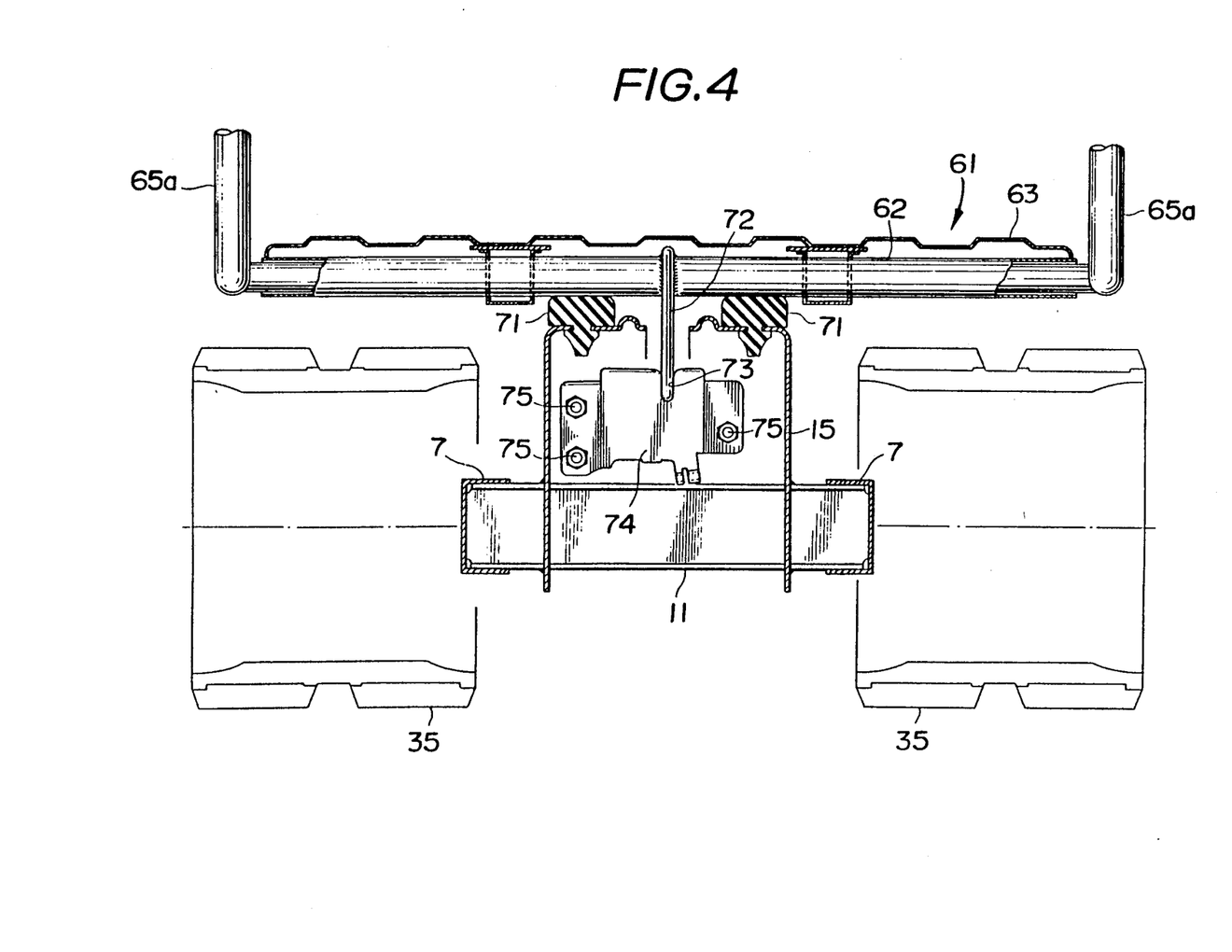
FIG. 4 is a cross-sectional view taken along line IV—IV of FIG. 1.

As shown in FIGS. 1, 3, and 4, the crawler-propelled truck 1 has a load carrying table 61 comprising a support plate 63 mounted on transversely extending pipe frames 62 and a frame assembly 65 surrounding the sides and rear end of the support plate 63. The frame assembly 65 has two grips 66 (only one shown) on its rear end. The frame assembly 65 includes a pair of transversely spaced side portions 65a having inwardly extending pipes 67 inserted in the pipe frames 62, and a pipe 68 in a rear portion 65a of the frame assembly 65. The width of the load carrying table 61, i.e., the dimension between the side portions 65b of the frame assembly 65 can be adjusted as indicated by the imaginary lines in FIG. 3 by loosening and tightening nuts 69 on the pipes 67, 68 and the pipe frames 62.

As better shown in FIG. 4, a pair of resilient bodies 71, 71 is disposed on the upper surface of the bracket 15. A support member 74 is secured by bolts 75 to the bracket 15. The support member 74 has an upwardly opening groove 73 in which there engages an engagement member 72 projecting downwardly from the load carrying table 61. The rear end of the load carrying table 61 is supported on the frame assembly 6 by the resilient bodies 71, 71, the engagement member 72, and the support member 74.

A pair of downwardly extending brackets 81, 81 (FIG. 3) is fixed to the load carrying table 61 above the shaft 41. The brackets 81, 81 are rotatably, but transversely immovably, mounted on respective brackets 82, 82 secured to the longitudinal frames 7, 7 by bushings 83, and bolts 84 and nuts 85. The bolts 84 have their axes positioned upwardly of the axis of the shaft 41. The load carrying table 61 is thus angularly movable about the bolts 84 between horizontal and forwardly inclined positions as indicated by the solid and imaginary lines respectively in FIG. 1.

Since the vertical engine 3 has its crankshaft 171 extending vertically, the crankshaft 171 is coupled to the gear transmission 100 directly by the bevel gears 111, 173 without requiring a gear train or a belt-and-pulley mechanism which would otherwise be provided in conventional crawler-propelled trucks. As a consequence, the drive unit comprising the engine 3 and the gear transmission case 5 is small in size, so that the load carrying space in front of the drive unit is increased and the center of gravity of the drive unit is lowered.

The engine 3, the gear transmission case 5, and the drive wheels 31 are in substantially vertical alignment with each other. This allows the weight of the drive unit to act directly on the drive wheels 31, thereby enabling the drive wheels 31 to contact the road surface under an increased pressure which results in an improved running capability of the crawler-propelled truck 1. Therefore, the crawler-propelled truck 1 can follow irregular road surfaces very closely or in a quick response.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

We claim:

1. A crawler-propelled truck comprising:
   a chassis frame assembly;
   an engine mounted on said chassis frame assembly and having a substantially vertical crankshaft;
   a gear transmission case having an upper portion coupled to said engine and housing a gear transmission operatively coupled to said engine;
   drive wheels supported on a lower portion of said gear transmission case and rotatable by said engine through said gear transmission;
   driven wheels rotatably supported on said chassis frame assembly forwardly of said drive wheels;
   crawlers trained around said drive and driven wheels; and
   a load carrying table mounted on said chassis frame assembly above said crawlers, said chassis frame assembly comprising a plurality of longitudinal frames and a plurality of transverse cross members connected to said longitudinal frames.

2. A crawler-propelled truck according to claim 1, wherein said driven wheels include front driven wheels movably supported by a shaft mounted on said chassis frame assembly at a front end thereof, and said truck further includes a crawler tensioning mechanism mounted on said chassis frame assembly for normally urging said front driven wheels in a direction to tension said crawlers.

3. A crawler-propelled truck according to claim 2, wherein said shaft movably supporting said front wheels is longitudinally movably mounted on said chassis frame, and said crawler tensioning mechanism normally urges said shaft in a forward direction.

4. A crawler-propelled truck according to claim 1, wherein said gear transmission comprises a plurality of output gears and a shift mechanism for manually selecting a desired one of the output gears.

5. A crawler-propelled truck according to claim 1, wherein said truck further includes means for angularly movably connecting said load carrying table to a front end of said chassis frame, and said load carrying table includes means for changing the width dimension thereof.

6. A crawler-propelled truck comprising:
   a chassis frame assembly including a plurality of longitudinal frames and a plurality of transverse cross members connected to said longitudinal frames;
   an engine mounted on said chassis frame assembly and having a substantially vertical crankshaft;
   a gear transmission case having an upper portion coupled to said engine and housing a gear transmission operatively coupled to said engine;
   drive wheels supported on a lower portion of said gear transmission case and rotatable by said engine through said gear transmission;
   driven wheels rotatably supported on said chassis frame assembly forwardly of said drive wheels;
   crawlers trained around said drive and driven wheels; and
   a load carrying table mounted on said chassis frame assembly above said crawlers;
   said driven wheels include front driven wheels movably supported by a shaft mounted on said chassis frame assembly at a front end thereof;
   said truck further including a crawler tensioning mechanism mounted on said chassis frame assembly for normally urging said front driven wheels in a direction to tension said crawlers; and
   said crawler tensioning mechanism comprising a bolt and a spring which are mounted between one of said cross members and said shaft.

* * * * *

UNITED STATES PATENT AND TRADEMARK OFFICE
CERTIFICATE OF CORRECTION

PATENT NO. : 5,064,011

DATED : November 12, 1991

INVENTOR(S) : Ogano et al.

It is certified that error appears in the above-identified patent and that said Letters Patent is hereby corrected as shown below:

Column 4, line 15, change "51 and The cross member 11, the" to --51 and the cross member 11. The--;

line 38, delete "10";

line 45, change "65a" to --65b--;

line 47, change "65b" to --65a--.

Signed and Sealed this

Ninth Day of March, 1993

Attest:

STEPHEN G. KUNIN

Attesting Officer

Acting Commissioner of Patents and Trademarks